*Holmes & Edes,*
*Making Rivets.*
N°1,564. Patented Apr. 24, 1840.
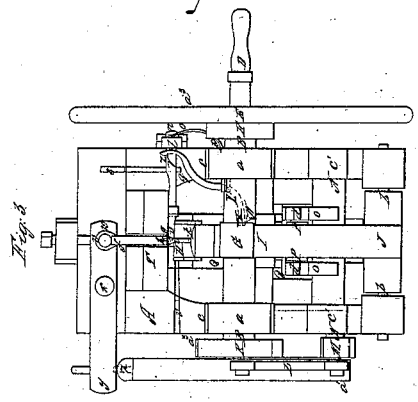
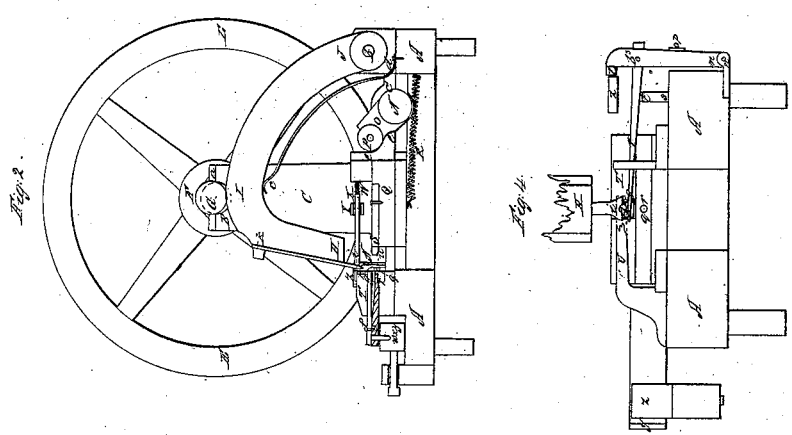
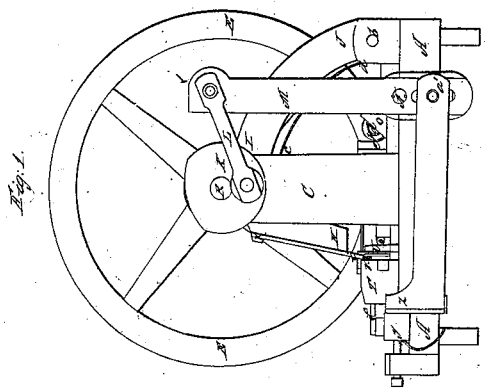

UNITED STATES PATENT OFFICE.

OLIVER EDES AND ANDREW HOLMES, OF BRAINTREE, MASSACHUSETTS.

MACHINERY FOR MAKING RIVETS.

Specification of Letters Patent No. 1,564, dated April 24, 1840.

*To all whom it may concern:*

Be it known that we, OLIVER EDES and ANDREW HOLMES, of Braintree, county of Norfolk, and State of Massachusetts, have invented new and useful Improvements in Machinery for Making Rivets.

The said improvements, the principles thereof, and modes in which we have contemplated the application of the same by which they may be distinguished from other inventions of a like character, together with such parts, improvements, or combinations we claim as our invention and consider original and new, we have herein set forth and described, which description, taken in connection with the accompanying drawings, herein referred to, forms our specification.

Figures 1, 2, 3, and 4 represent our improvements, Fig. 1 being an elevation; Fig. 2, a section; Fig. 3, a plan or top view of the same, and Fig. 4 some of the parts in detail or a section at $a^3$ $a^3$, Fig. 3.

A, A, A represents the framework of wood, metal or other proper material shaped and arranged as exhibited in the drawings, or otherwise suitably constructed to answer the intended purpose of supporting the operative parts of the machinery thereto attached.

B, B, is the main horizontal shaft supported in suitable bearings $a$ $a$ on the top of the upright posts or standards C C. On one end of the shaft B a drum pulley F, or crank D, Fig. 3, or other proper apparatus is to be affixed, communicating with the driving power.

E is a fly wheel conveniently placed on the shaft B B, the object of the same being to concentrate and store the superfluous power and regulate the action or motions of the machine.

A cam G, Figs. 2 and 3, is fixed on the center part of the main shaft B B and so shaped that at each revolution of said shaft B B it will depress one end of the lever or curved beam H I J. The curved beam H I J vibrates at one end J in bearings or supports $b$ $b$, and is pressed upward, when the elongated part of the cam G ceases to act on the same by a powerful spring $c$ $d$, one end $d$ of which is secured to the bottom plate of the frame, and the other $c$ rests and presses against the underside of the curved beam H I J.

A crank or drum K, Figs. 1 and 3, is fixed on the end of the shaft B, B, and by means of a connecting rod L, whose other end is attached to the top of a lever M, communicates a vibratory motion to a shaft N N, resting in bearings or boxes $c'$ $c'$. Two ears $o$ $o$ project from the shaft N N, and support in suitable bearings $d$ $d$ a cam roller P, see Figs. 1, 2 and 3.

The roller P rests upon or against a curved surface $e$, $e$, or the rear of the heading carriage Q, and operates, while vibrated in an arc of a circle, by the vibration of the shaft N, N, so as to push forward the heading carriage Q, which is drawn back when the roller P rises by the counter action of a wound cylindrical or other proper spring R, Fig. 2. The heading carriage Q is supported in suitable guides so as to allow it to move to and fro in a rectilinear direction, and carries the heading tool S attached to it by screws or in any convenient manner.

The rivets are cut from a cylindrical rod or wire of copper iron or any other metal suitable to the purpose, which rod is supported as it passes between the cutters, on or by a piece of steel $f$ $g$ Figs. 1, 2 3, 4 whose end $g$ Figs. 2 3 and 4 is bent upward a little at right angles, and has a semicircular guiding groove $h$ cut therein, the said piece of steel being affixed in a block of metal T Figs. 1 2 3, 4. The arm or beam H I J carries affixed to the end H, the steel cutter $i$ $k$, whose lower end (see Fig. 4) is hollowed out semicircularly to receive the wire as it passes between it and the edge of the resting block or piece of metal $f$ $g$. The wire or rod is fed in by the operative, until it strikes against the face of a step or standard U Figs. 1 3 and 4, when the beam H I J carrying the cutter $i$ $k$ is brought down and separates or cuts off that portion of rod which intervenes between the outer edge $g$ of the block $f$ $g$ and the face of the standard U, and the piece so separated falls on the upper face of an arm or finger V, Figs. 1, 2, 3, 4.

A stud W, Figs. 2 and 3, projecting from the heading carriage, meets and pushes forward (when said carriage advances) the extremity of a bent lever X Y Z whose fulcrum, or points of support, is at Y. The opposite end Z of the lever presses outward the top of an upright $l$, $m$, Figs. 3 and 4, whose lower end or foot is supported and vibrates in a proper bearing or joint $n$, attached to the bed of the frame.

The arm V before mentioned is supported at one end in a proper manner at $b^3$, Fig. 4, by the upright $l\ m$. As the upright $l\ m$ is forced outward by the bent lever X Y Z it is returned when the heading carriage recedes, by the counter action of a spring $o\ p$, Figs. 3 and 4. That portion of the wire which was cut off (and heretofore described as resting on the upper face of the arm V and nipped or held by it and the end $i$ of the cutter $i\ k$, see Fig. 4) is now carried downward by the further depression of the arm or beam H I J, until it arrives opposite a cylindrical aperture $q\ r$, Figs. 2 and 4, into which it is driven by the heading tool S of the advancing heading carriage Q, Fig. 2. This aperture is not quite so long as the portion of wire cut off to be formed into a rivet, just so much of the said portion as is necessary, for the formation of the head projecting beyond the face of the block T. As the heading carriage advances the tool S, strikes upon the projecting metal and gives it the requisite shape for the head of the rivet. Then as the carriage Q recedes the spring $s\ t$, bearing on the underside of the arm V, raises the arm V up to its former position to receive the next portion of wire separated by the cutter. The rivet so formed is pushed out of the aperture $q\ r$ by the action of the piston $u\ v$ Figs. 2 and 3 which is connected or joined to the end of a lever $w\ x\ y$ and driven forward by said lever when the beam H I J rises. The operation of the same is as follows. The lever vibrates on a pin or fulcrum $x$. The end $z$ of a long bar $z\ a'$ abuts against or is connected to the end $y$ of the lever $w\ x\ y$, the opposite end of said bar being connected to the lower part of the upright lever M, which projects downward below the shaft N N to the end of which it is attached. Therefore the vibrations of the lever M will cause the bar $z\ a'$ to press forward the end $y$ of the lever $w\ x\ y$ and thus push the rivet out of the aperture $q\ r$.

When the piece of wire to be headed is driven into the hole $q\ r$ it becomes necessary to withdraw the arm or shelf V from under the same, so that it may rise upward to receive the next piece separated by the cutters. This is effected by the action of the bent lever X Y Z pressing outward the top of the standard $l\ m$ (see Figs. 3 and 4) at the same time withdrawing the end of the arm V from under the rivet; which arm immediately flies upward by the counter action of the spring $s\ t$.

Having thus described and set forth the nature and principles of our improvements and exhibited them in the annexed drawings we shall now proceed to specifically point out and explain such parts therein as we consider new and claim to be our inventions.

1. We claim a lever or beam H I J (to which the cutter $i\ k$ is attached) operated on or pressed downward, by the cam G on a horizontal shaft B B, in combination with the steel block $f\ g$, and standard or gage U, the whole operating to cut off and regulate the length of the piece of wire to be formed into a rivet.

2. We claim the combination of the cutter $i\ k$ and arm V for pinching or nipping the piece of wire separated by the cutters, and conveying it downward (by descent of the cutter $i\ k$) to the aperture $q\ r$ to be headed by the heading machinery: and we claim that combination and arrangement of the parts, for withdrawing the arm V from under the head of the rivet in the aperture $q\ r$; the said combination and arrangement consisting of the bent lever X Y Z, the standard $l\ m$ spring $o\ p$ connected to the shelf or arm V, and operated by a stud or projection W from the heading carriage substantially in manner above described.

3. We claim the combination of machinery, (consisting of an upright lever M bar $a'\ z$, lever $w\ x\ y$ and piston $u\ v$ operated by a crank K on the main shaft B B and connecting rod L) for forcing or pushing out the rivet from the aperture $q\ r$ after the heading machinery has performed its office.

In testimony that the above is a true description of our said invention and improvements, we have hereto set our hands this twenty-fifth day of January in the year eighteen hundred and forty.

OLIVER EDES.
    ANDREW HOLMES.

Witnesses:
 R. H. Eddy,
 Ezra Lincoln, Jr.